United States Patent [19]

Klimkovsky et al.

[11] 4,202,439
[45] May 13, 1980

[54] THROWER OF TRANSPORTED MATERIALS

[76] Inventors: Bronislav M. Klimkovsky, ulitsa Universitetskaya, 2, korpus 1, kv. 12; Boris A. Azikov, ulitsa Poligonnaya, 22, kv. 68, both of Dnepropetrovsk; Mikhail U. Zemtsov, Delegatskaya ulitsa 9, kv. 110, Moscow; Sergei A. Kusch, prospekt Ilicha, 17, kv. 27; Nikolai P. Nalivkin, prospekt Ilicha, 17, kv. 21, both of Dnepropetrovsk, all of U.S.S.R.

[21] Appl. No.: 924,087

[22] Filed: Jul. 12, 1978

[51] Int. Cl.² .............................................. B65G 31/04
[52] U.S. Cl. .................................................... 198/642
[58] Field of Search ................................ 198/638–642; 124/6; 272/37, 38; 239/681

[56] References Cited

U.S. PATENT DOCUMENTS

| 2,259,691 | 10/1941 | Harris | 272/37 |
| 3,128,870 | 4/1964 | deBuhr | 198/641 |

FOREIGN PATENT DOCUMENTS

| 367509 | 1/1939 | Italy | 198/641 |
| 558835 | 9/1977 | U.S.S.R. | 198/642 |

Primary Examiner—James L. Rowland
Attorney, Agent, or Firm—Robert E. Burns; Emmanuel J. Lobato; Bruce L. Adams

[57] ABSTRACT

A thrower constructed for the mining industry and comprises a rotatable rotor pivotally connected by means of at least one connecting rod with a bucket adapted to receive and unload material. The spacing of the axis of rotation of the rotor from the axis of rotation of the adjacent pivot of the connecting rod is twice the spacing between the axes of rotation of the two pivots of the connecting rod, parallel with the axis of rotation of the rotor. In operation, the drive of the thrower effects rotation of the rotor and of the connecting rod in the same direction at the same speed, as well as rotation of the bucket in the same direction at a speed which is twice the rotation speed of the rotor. The material is loaded into the bucket in the lower portion of the rotor, since the absolute speed equals zero at this point of its path. The material is thrown the bucket at a predetermined point of its path, the moment the direction of the centrifugal force aligns with the upper open portion of the bucket, the latter being mounted so that it can be adjusted and retained in a preselected position relative to the horizontal plane.

3 Claims, 3 Drawing Figures

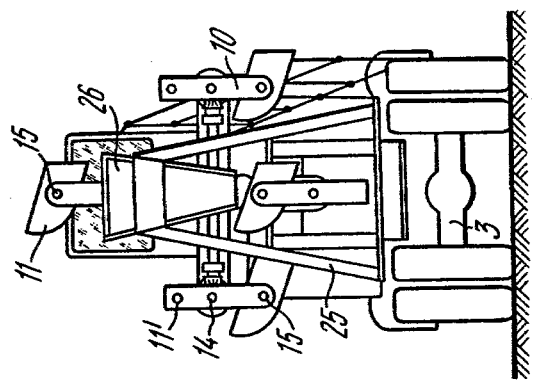
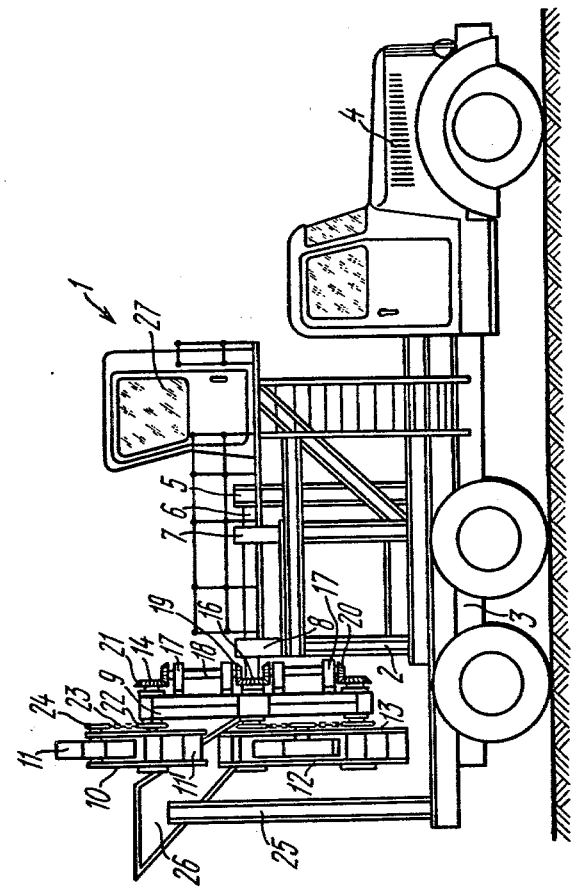

THROWER OF TRANSPORTED MATERIALS

BACKGROUND OF THE INVENTION

The invention relates to transportation means employed by the mining industry, and more particularly it relates to a thrower of transported materials.

The invention can be utilized to utmost effectiveness in quarries where ores of ferrous and non-ferrous metals are mined, to dislodge the mass of rock from the site of the immediate excavation to either the side of the quarry, or to areas wherefrom this mass can be transported by other means of transportation.

The invention can be likewise broadly used in the construction industry, e.g. at excavation of construction materials which can be thrown from the place of excavation to the loading area, at construction of embankments leading to bridges over rivers and marshes, at damming rivers, at constructing embankments for railways and highways, at filling-up at mining. The invention can be also used for load handling, e.g. for reloading of grain, for loading construction materials, such as clay, road metal, etc. into sea and river ships, for averaging the composition of mixtures at iron ore nodulizing factories, etc.

Nowadays transportation by conveyors is considered an advanced technique ever wider used by the mining industry. However, the technique is not free from some disadvantages. The complicated and costly maintenance and repairs of conveyer belts of considerable lengths, the sticking of the material to the belts, the necessity of moving the masses of the belt and its support rollers jointly with the load affect the efficiency of the technique. Furthermore, belt conveyers have great amounts of metal in their structures and necessitate the use of complicated and metal-consuming dump formers or stokers. Their open-air operation involves weather-induced complications. All the abovesaid adds up to the relatively high energy consumption and impaired performance, to say nothing of the problem of transporting rock masses by belt conveyors being complicated still further if the path of the transportation is to be an inclined one, particularly, a steep one.

The hydraulic and pneumatic transportation techniques, also employed nowadays, have disadvantages arising from the necessity of mixing a load to be transported with water or air, the mass of the water or air being substantially greater than the mass of the load. The techniques require specifically provided pipelines offering additional resistance to the progress of the load; other apparatus and plant are also required to perform the transportation.

The complexity of the process itself and of the plant performing it, putting as it does positive limitations as to the use of the last-mentioned techniques, explains the very narrow field of uses of the hydraulic and pneumatic transportation in the total scope of load-handling in the mining industry.

One should also mention for comparison sake the use of excavators for dislodging rock masses over relatively short distances. When a load is transported by the slewing of an excavator, it has added thereto the significant mass of the slewing parts of the excavator, the value of the mass of an excavator per unit of the bucket capacity increasing with the increasing capacity of the excavator itself; this obviously affects the efficiency of the machine and brings up the transportation costs.

The above short discourse into the means of transportation of rock mass enables one to draw a conclusion that in the field of excavation of rock mass one should look for the reduction of energy consumption and costs in three major directions, viz: reducing the mass of the container parts of the transportation means to a positive minimum and, in an ideal case, eliminating it altogether; reducing the length of the path of conveying the rock mass from an excavation area in the quarry, striving toward having this path extending along a straight line from the excavation area toward the quarry side; conveying the rock mass with the minimum resistance offered to its progress.

Now, considering the abovestated trends of reducing the energy and operational costs as the requirements put before the newly constructed transportation means, one can formulate the ideal case, as follows:

the load is transported free of containers enclosing or supporting it:

the load is transported via the shortest route from the excavation area to the side of the quarry, i.e. along a straight line;

the load is transported with the minimum resistance to its progress, i.e. through air, with the resistance of the bearings and support members of the transportation means positively eliminated.

The transportation of loads with the above requirements met can be effected by throwing, i.e. by free flight of a load having an initial velocity.

The hitherto known throwing arrengements used for accelerating and throwing gaseous, liquid and solid bodies are not usable in the presently described case for a number of reasons of which the main one is that the known throwers, e.g. employed for military purposes, have both a low efficiency factor and low throughput. The known centrifugal throwers of the rotary pump type, on the other hand, would not provide for aimed or directional throwing.

Thus, the centrifugal thrower (cf., the U.S. Pat. No. 3,613,655; Cl. 124-6) is intended for throwing projectiles at a high speed and comprises a rotatable rotor with a peripheral guideway. The thrower incorporates an annular trough along which a projectile is moved at a high acceleration from an input area either at or adjacent to the center of the rotor to the outlet area of the peripheral guideway. The trough is made up of an external concave section and an internal convex section, with the external surface of the concave section facing in the direction of the rotation of the rotor.

Even if one presumes that the abovedescribed thrower is capable of directed or aimed throwing of projectiles, it is, nonetheless, not fit for throwing rock masses.

Firstly, the authors of the abovedescribed structure themselves presume that the thrower would accelerate a projectile of a specified geometric shape and dimensions corresponding to the annular trough of the rotor. Secondly, the projectile moves along the trough by sliding friction forces. When one considers that the rock mass may have its particle composition varying within a wide range, it becomes understandable that the specifically dimensioned and gauged trough does not fit the picture, whereas it is obviously impractical to dimension or gauge the rock mass to fit the channel of a given shape. Furthermore, if one considers that the rock mass is abrasive to a degree that its forwarding in the rotor by the sliding friction forces would wear out the rotor within a very short period, it is likewise obvious that the abovedescribed thrower is not operable for the practical purposes of throwing the rock mass.

It is an object of the present invention to increase the efficiency of the transportation of a material.

It is another object of the present invention to reduce the amount of metal in the means used for the transportation of a material.

It is still another object of the present invention to provide a thrower capable of directed or aimed throwing of a bulk material and piece loads.

These and other objects of the present invention are attained in a thrower of transported materials, comprising a rotatable rotor with means for receiving and unloading the material, wherein, in accordance with the present invention, each receiving and unloading means includes a container pivotally connected with the rotor through at least one intermediate connecting rod, the axis of the rotation of the rotor and the axes of rotation of the connecting rod being parallel, the spacing between the axes of rotation of the pivots of the connecting rod equalling one half of the spacing between the axis of the rotation of the rotor and the axis of rotation of the pivot of the connecting rod the thrower further is provided with a drive for rotating the said rotor and the said connecting rod in the same direction at the same angular speed, and rotating said container at an angular speed which is twice the angular speed of the rotation of the rotor.

SUMMARY OF THE INVENTION

According to one embodiment of the present invention, the rotor is shaped as a cross of which the ends are equally spaced from the axis of the rotation of the cross and are pivotally connected with the respective ones of said containers for receiving and unloading the material.

In another embodiment of the present invention the container for receiving and unloading the material is in the form of a bucket with a counterweight, pivotally connected with a connecting rod, with provisions for adjusting and retaining the bucket relative to the horizontal plane. This feature enables the material to fly at a predetermined angle relative to the horizontal plane.

The present invention significantly enhances the efficiency of the transportation of materials and effects directed throwing over considerable distances. The structure of the herein disclosed thrower applies no practical limitations as to the throughput thereof, the effectiveness of the employment of the thrower being enhanced when it is used in places where either the access or the arrangement of other transportation means is impaired.

When the herein proposed thrower is compared with the hitherto known transportation means, its following advantageous properties can be pointed out. The thrower is both structurally simple and simple to operate and control. Its control can be completely automated, i.e. the thrower is operable without an operator. The specific metal consumption of the thrower is about one tenth of that of a dump former or stoker of the same capacity. When mounted on an undercarriage of a high cross-country ability, the thrower becomes a highly maneuverable and mobile vehicle. The high efficiency, the low specific metal consumption, the mobility and versatility of the operation enable to cut down the transportation costs at ore mining by as much as 30 to 40 percent.

BRIEF DESCRIPTION OF THE DRAWINGS

Other objects and advantages of the present invention will become apparent from the following detailed description of an embodiment thereof, with reference being had to the appended drawings wherein:

FIG. 1 is a side view of a thrower embodying the invention, mounted on a cross-country truck chassis;

FIG. 2 is a front view of the thrower of FIG. 1;

DESCRIPTION OF THE PREFERRED EMBODIMENTS

Figure 3:
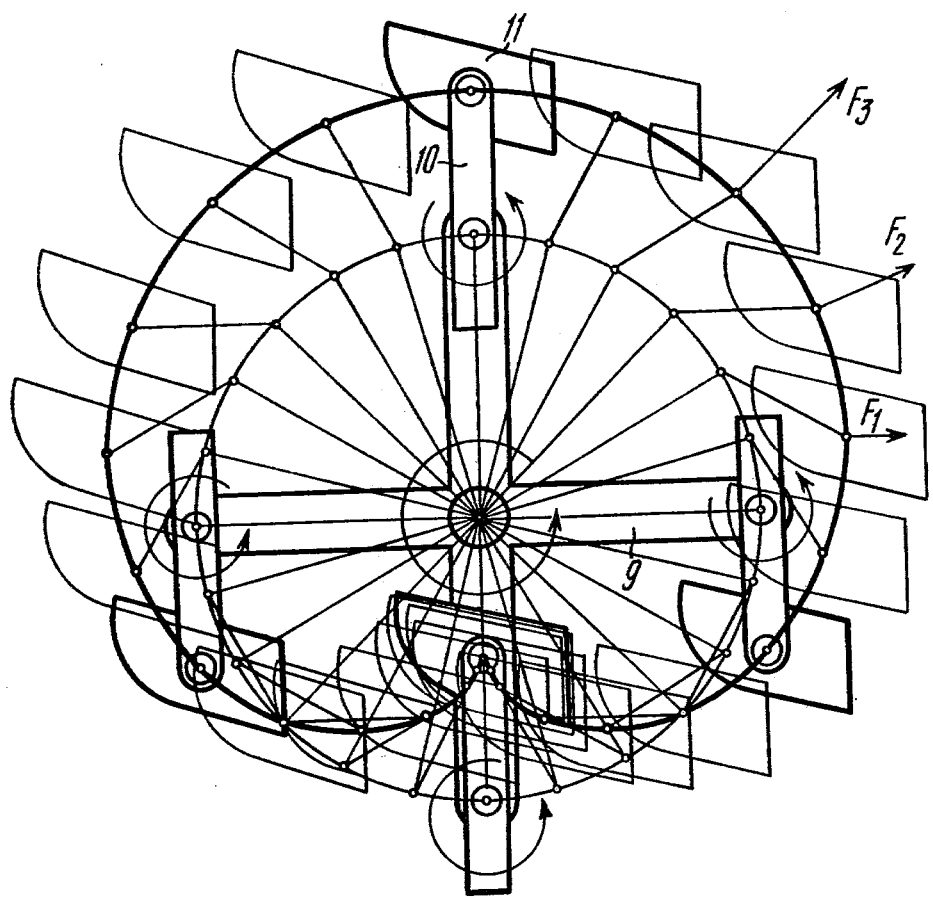
FIG. 3 illustrates the path of the bucket in operation of the thrower.
Figure 4:
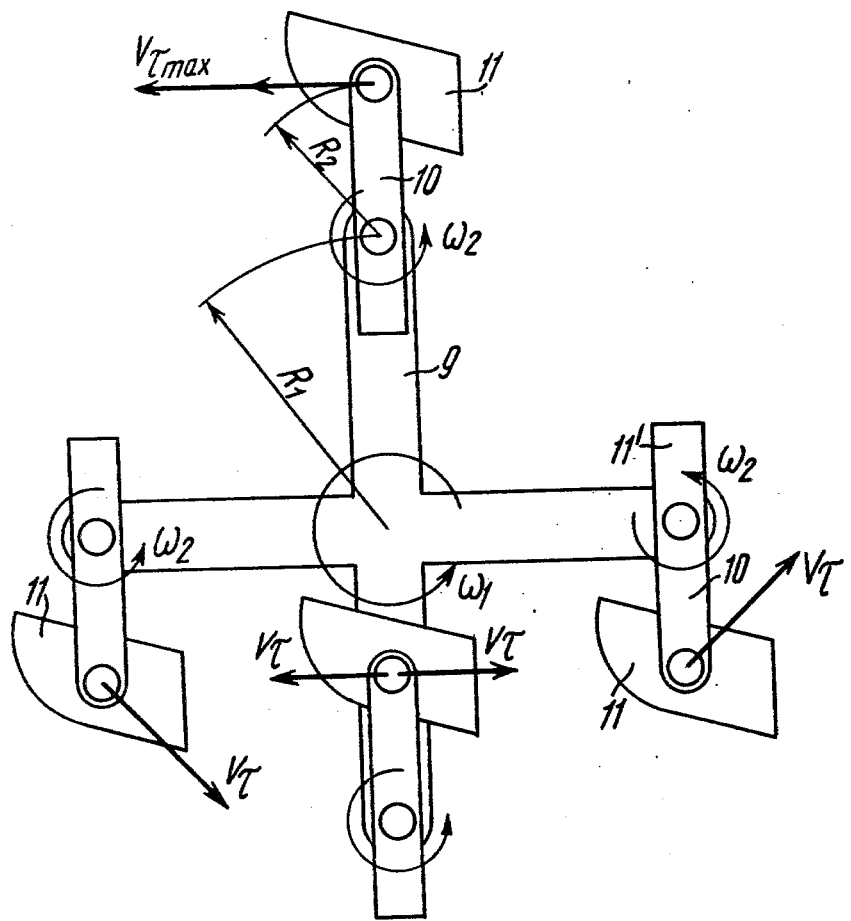
FIG. 4 illustrates the retained position and the directions of the linear speeds of the rotation of the major elements of the thrower at the material loading and unloading moments.

Referring now to the drawings, the thrower 1 (FIGS. 1 to 4) comprises a frame 2 mounted on the self-propelled undercarriage or chassis 3 of a cross-country truck 4. The frame 2 supports all the component assemblies of the thrower 1 which is driven in operation from the engine (not shown) of the truck 4.

The driving arrangement or drive 5 connects the engine-driven shaft of the truck 4, e.g. its propeller shaft, with the main shaft 6 of the thrower 1. The shaft 6 is journalled in bearings 7, 8 fixed on the frame 2. The shaft 6 has mounted thereon a rotatable rotor which in the presently described embodiment is in the form of a cross 9 of which the ends are connected with connecting rods 10 for pivotal mounting of buckets 11 having counterweights 11', the buckets 11 being the containers adapted to receive and unload the material being transported. Each connecting rod 10 is made up of two side members 12, 13 pivotable about shafts 14, 15 parallel with the axis of the rotation of the cross 9, the spacing $R_1$ between the last-mentioned axis and the shaft 14 being twice the spacing $R_2$ between the respective pivot shafts 14, 15 of the connecting rod 10.

The driving connection between the major elements of the thrower 1 is, as follows. The shaft 6 has mounted thereon the central bevel gear 16. The cross 9 has journalled therein in bearings 17 shafts 18 carrying on the opposite ends thereof bevel pinions 19, 20. The pinions 19 mesh with the central gear 16, while the pinions 20 mesh with bevel pinions 21 mounted on the respective shafts 14. At the opposite side of the cross 9, each shaft 14 carries a sprocket wheel 22 engaging a driving chain 23 also running about a sprocket wheel 24 mounted on the respective shaft 15. Each shaft 15 has the respective bucket 11 mounted thereon so that the latter can be adjusted and retained on the shaft 15 at a desired position relative to the horizontal plane. In the presently described embodiment the adjusted and retained angular position of the bucket 11 on the shaft 15 is attained by shifting the endless driving chain 23 connecting the sprocket wheels 22 and 24. The thrower 1 also incorporates a support 25 with a bunker or hopper 26 through which the transported material is guided into the buckets 11.

The transmission ratios of the gear, pinions and sprocket wheels is such that the angular speed of the rotation of the buckets 11 is twice the angular speed of the rotation of the cross 9 with the connecting rods 10.

The operation of the thrower 1 is controlled from a control panel accommodated in the operator's cab 27.

The thrower 1 operates, as follows. With the engine of the truck 4 started, the operator uses the control panel (not shown) in the cab 27 to accelerate the rotor, i.e. the cross 9 to the required r.p.m. value.

Now the cross 9 and the connecting rods 10 are rotated in the same direction at the same angular speeds $\omega_1 = \omega_2$ (FIG. 4), while the bucket 11 rotates in the same direction at an angular speed which is twice the angular speed of the rotation of the cross 9. The transported material, e.g. clay is fed into the hopper 26 in a continuous stream. At the bottommost point of the cross 9 (FIGS. 3, 4), owing to the algebraic addition of the linear speeds (with the vectors $V_T$ of the speeds extending tangentially of the path) of the rotation of the cross 9 and of the connecting rod 10, the bucket 11 is decelerated to a standstill. Thus, at the bottommost point of the cross 9, with the absolute speed of the bucket 11 having been reduced to zero, the bucket 11 is loaded practically without an impact. Then the loaded material is accelerated jointly with the bucket 11 carrying it, the maximum speed being attained by this acceleration at 180° from the point of the loading of the bucket 11. The centrifugal force $F_1$, $F_2$, $F_3$ (FIG. 3) being always perpendicular to the path of the bucket 11, the direction and value of this force vary and are different at different points of the path.

With the position of the bucket 11 being fixed relative to the horizontal plane, the load is able to leave the bucket 11 solely when the walls of the latter do not retain the load in the direction of the action of the centrifugal force. Therefore, when the direction of the centrifugal force aligns with the open top area of the bucket 11, the load leaves the bucket 11 and is projected in a free flight along the tangent to the point of the path of the bucket whereat the load leaves the bucket 11.

The free flight of the load is characterized by a number of parameters and depends on a number of important variables; however, the major criteria influencing this free flight are the initial speed of the flight and the angle to the horizontal plane, at which the load leaves the bucket 11. To attain the maximum throwing distance, this angle should be about 45° to the horizontal plane. Should it be necessary to throw the load to a specified height at a specified angle, the angle of the inclination of that one of the walls of the bucket 11, along which the load flies off the bucket under the action of the centrifugal force is to be varied. By varying this angle it is possible to have the load thrown off by the centrifugal force at a required angle to the horizontal plane. The adjustment of the position of the bucket 11 in space and the variation of the inclination of its load-guiding wall enable to throw the load practically at any angle to the horizontal plane and thus to set either the required distance or the required height of the delivery of the load. The adjustment of the r.p.m. value of the engine in combination with the adjustment of the inclination of the bucket 11 provide for the aiming of the delivery, with both the delivery distance and height being adjustable within a certain range. Upon the load having left the bucket 11, its flight is determined by the momentum gained, the gravity force and the resistance of the air. The computation of the flight should provide for the above factors, for the throwing to be precisely aimed. In practice, the above factors can be introduced into a calculation, whereby the transportation of a load by throwing becomes a process both controllable and adjustable.

To increase the throwing speed and distance, the cross 9 may be connected with the buckets 11 via several successively pivotally jointed connecting rods 10 having identical geometrical dimensions. In this embodiment of the invention the distance of throwing the load is increased by the addition of the linear speeds of the entire succession of the connecting rods at the moment of throwing, as well as owing to the increased spacing between the axis of the rotation of the cross 9 and the point of the path of the bucket 11, whereat the load is thrown.

What we claim is:

1. A thrower of transported materials, comprising: a rotatable rotor; at least one container adapted to receive and unload the said material, pivotally connected with said rotor; at least one intermediate connecting rod pivotally interconnecting said rotor and said container respectively, the axes of the rotation of said rotor and of the pivots of said connecting rod being parallel, the distance between the said axes of the rotation of the pivots of said connecting rod equalling one half of the distance between the axis of the rotation of said rotor and the axis of the rotation of the pivot of said connecting rod; a drive for rotating in the same direction said rotor and said connecting rod at a relative angular speed and for rotating said container at a speed which is twice the speed of the rotation of said rotor.

2. A thrower as claimed as set forth in claim 1, including a plurality of material receiving and unloading of containers and wherein said rotor is in the form of a cross of which the ends are connected pivotally to said material-receiving and unloading containers at the same spacing from the axis of rotation of said cross.

3. A thrower as claimed as set forth in claim 1, wherein said container to receive and unload the material comprises a bucket with a counterweight, pivotally connected with the connecting rod, and means providing for adjusting and retaining the bucket in a required position relative to the horizontal plane.

* * * * *